(12) United States Patent
Alabdulmuhsin et al.

(10) Patent No.: US 10,641,074 B1
(45) Date of Patent: May 5, 2020

(54) ISOLATION TECHNIQUES FOR FRACTURING ROCK FORMATIONS IN OIL AND GAS APPLICATIONS

(71) Applicant: Saudi Arabian Oil Company, Dhahran (SA)

(72) Inventors: Ali H. Alabdulmuhsin, Alahsa (SA);
Jon E. Hansen, Udhailiyah (SA);
Hamad F. Al-Kulaib, Alahsa (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/377,523

(22) Filed: Apr. 8, 2019

(51) Int. Cl.
*E21B 43/26* (2006.01)
*C09K 8/72* (2006.01)

(52) U.S. Cl.
CPC .............. *E21B 43/261* (2013.01); *C09K 8/72* (2013.01)

(58) Field of Classification Search
CPC ................................ E21B 43/261; C09K 8/72
See application file for complete search history.

(56) References Cited

U.S. PATENT DOCUMENTS

| | | | |
|---|---|---|---|
| 7,350,752 B2 | 4/2008 | Paradis et al. | |
| 7,565,929 B2 | 7/2009 | Bustos et al. | |
| 7,748,458 B2 | 7/2010 | Hocking | |
| 8,490,698 B2 * | 7/2013 | Panga | C09K 8/80 166/278 |
| 9,574,408 B2 | 2/2017 | Cochran et al. | |
| 2014/0174737 A1 * | 6/2014 | Reddy | C09K 8/426 166/281 |

* cited by examiner

*Primary Examiner* — Silvana C Runyan
(74) *Attorney, Agent, or Firm* — Fish & Richardson P.C.

(57) ABSTRACT

A method of fracturing a rock formation includes delivering particles to a wellbore disposed within the rock formation along a first section of the rock formation, flowing the particles into multiple gaps formed between the formation and a sealing element disposed within the wellbore at an intermediate position between the first section and a second section of the rock formation located downstream of the first section to fluidically isolate the first section from the second section, delivering treatment fluid to the wellbore along the first section of the rock formation, and reacting the treatment fluid with the rock formation along the first section to fracture the rock formation along the first section.

18 Claims, 8 Drawing Sheets

ISOLATION TECHNIQUES FOR FRACTURING ROCK FORMATIONS IN OIL AND GAS APPLICATIONS

TECHNICAL FIELD

This disclosure relates to methods of fracturing rock formations via multi-stage fracturing techniques.

BACKGROUND

Producing hydrocarbons from a rock formation often requires stimulation of the rock formation, especially for rock formations of low permeability. A stimulation process may include pumping a specially designed stimulation fluid into a wellbore within the rock formation at a pressure that is high enough for the stimulation fluid to sufficiently infiltrate and react with the rock formation to cause a fracture in the rock formation. In some examples, consecutive stages (for example, axial sections) of the rock formation are stimulated serially in a process known as multi-stage fracturing. In a multi-stage fracturing process, each stage of the rock formation is fluidically isolated from an adjacent downstream stage while being stimulated. A commonly occurring problem in multi-stage fracturing processes is failure of fluidic isolation of adjacent stages (for example, isolation failure), such that stimulation fluid introduced to a target stage leaks into an adjacent downstream stage that has already been stimulated. Leakage of the stimulation fluid into the adjacent stage results in a drop in fluid pressure at the target stage such that the stimulation fluid can no longer sufficiently infiltrate the rock formation to cause adequate fracturing in the formation at the target stage. Isolation failure within a wellbore can result in cancellation of a stimulation process, a prolonged time period for completing stimulation at a target stage (for example, including repeating stimulation at an adjacent downstream stage), and/or undesirable modifications to stimulation fluid volumes and stimulation fluid pumping rates within the wellbore.

SUMMARY

This disclosure relates to multi-stage fracturing processes in which degradable particles are pumped to into a wellbore along a target stage of a formation that is to be fractured before stimulation fluid is pumped into the wellbore along the target stage. The degradable particles can plug openings between the formation and a packer located downstream of the target stage in order to isolate the target stage from a previously stimulated, adjacent stage located downstream of the target stage. For example, the degradable particles, while lodged within the openings, can prevent stimulation fluid that is delivered to the target stage from leaking down through the openings to the adjacent stage to fluidically isolate the target stage from the adjacent stage. Accordingly, stimulation fluid that would otherwise pass through the openings is diverted to (for example, maintained at) the target stage, allowing a pressure of the stimulation fluid to build to a level that is sufficient to cause the stimulation fluid to permeate and fracture the formation at the target stage.

In one aspect, a method of fracturing a rock formation includes delivering particles to a wellbore disposed within the rock formation along a first section of the rock formation, flowing the particles into multiple gaps formed between the formation and a sealing element disposed within the wellbore at an intermediate position between the first section and a second section of the rock formation located downstream of the first section to fluidically isolate the first section from the second section, delivering treatment fluid to the wellbore along the first section of the rock formation, and reacting the treatment fluid with the rock formation along the first section to fracture the rock formation along the first section.

Embodiments may provide one or more of the following features.

In some embodiments, method further includes delivering treatment fluid to the wellbore along the second section of the rock formation prior to delivering the particles to the wellbore along the first section of the rock formation.

In some embodiments, the method further includes reacting the treatment fluid with the rock formation along the second section to fracture the rock formation along the second section.

In some embodiments, the particles include degradable particles that degrade after fracturing of the rock formation.

In some embodiments, the particles are suspended in a fluid.

In some embodiments, the method further includes flowing the particles through a tubular member disposed within the wellbore.

In some embodiments, the sealing element is disposed outside of the tubular member.

In some embodiments, the method further includes operating a ball-and-seat mechanism to isolate the first section of the rock formation from the second section of the rock formation within an interior region of the tubular member.

In some embodiments, the method further includes activating a fracturing port of the tubular member under pressure of the treatment fluid within the interior region of the tubular member.

In some embodiments, the method further includes flowing the particles out of the tubular member through the fracturing port and into the wellbore.

In some embodiments, the method further includes delivering a testing fluid to the wellbore along a second section of the rock formation before delivering the particles to the wellbore.

In some embodiments, the method further includes determining a lack of isolation between the first and second sections of the rock formation based on a drop in a pressure of the testing fluid before delivering the particles to the wellbore.

In some embodiments, the treatment fluid is an acidic fluid.

In some embodiments, the method further includes diverting the treatment fluid to the wellbore along the first stage.

In some embodiments, the method further includes preventing the treatment fluid from flowing within the wellbore along the second section of the rock formation while delivering the treatment fluid to the first section of the rock formation.

In some embodiments, the method further includes pressurizing the treatment fluid.

In some embodiments, the treatment fluid can attain a fluid pressure of up to about 14,500 psi within the wellbore along the first section of the rock formation, depending on certain aspects of a well completion and an ability of the well completion to resist pressure.

In some embodiments, the multiple gaps are first multiple gaps, the sealing element is a first sealing element, and the intermediate position is a first intermediate position, the method further including delivering particles to the wellbore along a third section of the rock formation located upstream of the first section after fracturing the rock formation along the first section, flowing the particles into second multiple gaps formed between the formation and a second sealing element disposed within the wellbore at a second intermediate position between the third section and the first section to fluidically isolate the third section from the first section, delivering treatment fluid to the wellbore along the third section of the rock formation, and reacting the treatment fluid with the rock formation along the third section to fracture the rock formation along the third section.

In some embodiments, the third section of the rock formation is adjacent to the second section.

In some embodiments, the second section of the rock formation is adjacent to the first section.

The details of one or more embodiments are set forth in the accompanying drawings and description. Other features, aspects, and advantages of the embodiments will become apparent from the description, drawings, and claims.

DETAILED DESCRIPTION

Figure 1:
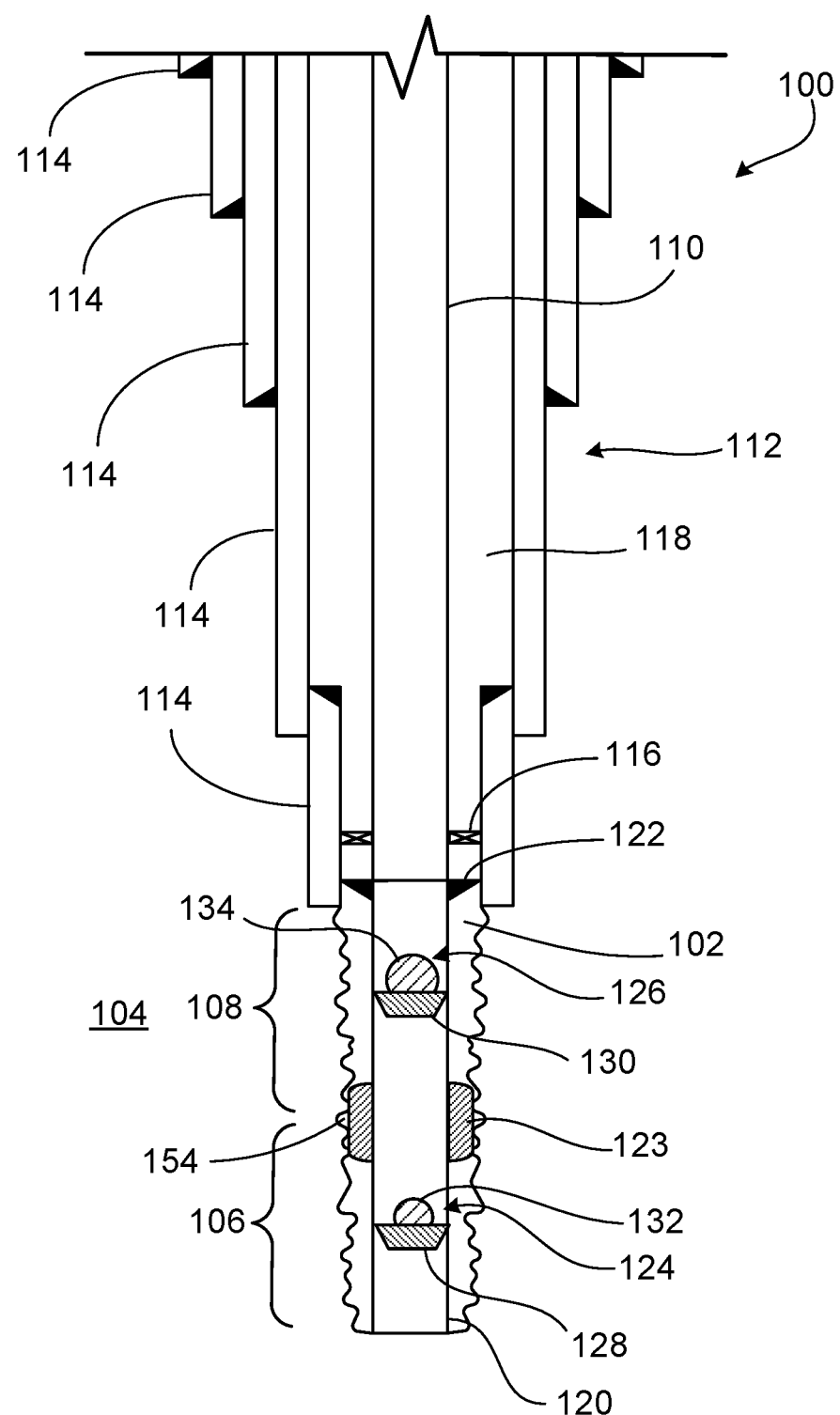
FIG. 1 is a side view of an example well completion system disposed within a wellbore of a formation.

FIG. 1 illustrates a well completion system 100 disposed within a wellbore 102 of a formation 104 (for example, a rock formation). The well completion system 100 is utilized for carrying out multi-stage fracturing techniques to hydraulically stimulate production of hydrocarbons from the formation 104 by delivering a stimulation fluid to the formation 104. In the example illustration of FIG. 1, the well completion system 100 is configured for carrying out multi-stage fracturing serially at a first stage 106 of the formation 104 and at a second stage 108 of the formation 104. The stimulation fluid is an acidic fluid that can react with substances in the formation 104 to enlarge pores within the formation 104. Enlargement of the pores causes fractures in the formation 104 at which hydrocarbons can be accessed at (for example, drained from) the formation 104.

The well completion system 100 includes a delivery tube 110 (for example, a production tubing) through which stimulation fluid can be delivered to the wellbore 102, a graduated pipe assembly 112 (for example, a casing string) disposed within the wellbore 102 and including a series of pipe segments 114 (for example, liners) for protecting the delivery tube 110, and a production packer 116 that anchors the delivery tube 110 to the pipe assembly 112 and isolates a lumen 118 of the pipe assembly 112 from the wellbore 102. The well completion system 100 further includes a production pipe 120 (for example, a production liner) that extends from the delivery tube 110 for delivering stimulation fluid to the wellbore 102, an anchor 122 (for example, a liner hanger) by which the production pipe 120 is attached to the terminal pipe segment 114 of the pipe assembly 112, a formation packer 123 that anchors the production pipe 120 to the formation 104 and isolates the stages 106, 108 from each other outside of the production pipe 120, and isolation mechanisms 124, 126 that isolate the stages 106, 108 from each other from within the production pipe 120.

The isolation mechanisms 124, 126 respectively include seats 128, 130 that are attached to the production pipe 120 at fixed locations and cooperating balls 132, 134 that are introduced into the production pipe 120 to respectively land on (for example, abut) and seal complementary openings in the seats 128, 130. Because the isolation mechanism 124 is located downstream of the isolation mechanism 126, the ball 132 is introduced into the production pipe 120 before the ball 134 is introduced into the production pipe 120. The seat 130 has a larger inner diameter than does the ball 132 such that the ball 132 can pass downward through the seat 130 to contact the seat 128. Subsequently, the ball 134, having a larger diameter than the ball 132, is introduced into the production pipe 120 to seal the seat 130 for carrying out fracturing at the second stage 108 of the formation 104.

Figure 2:
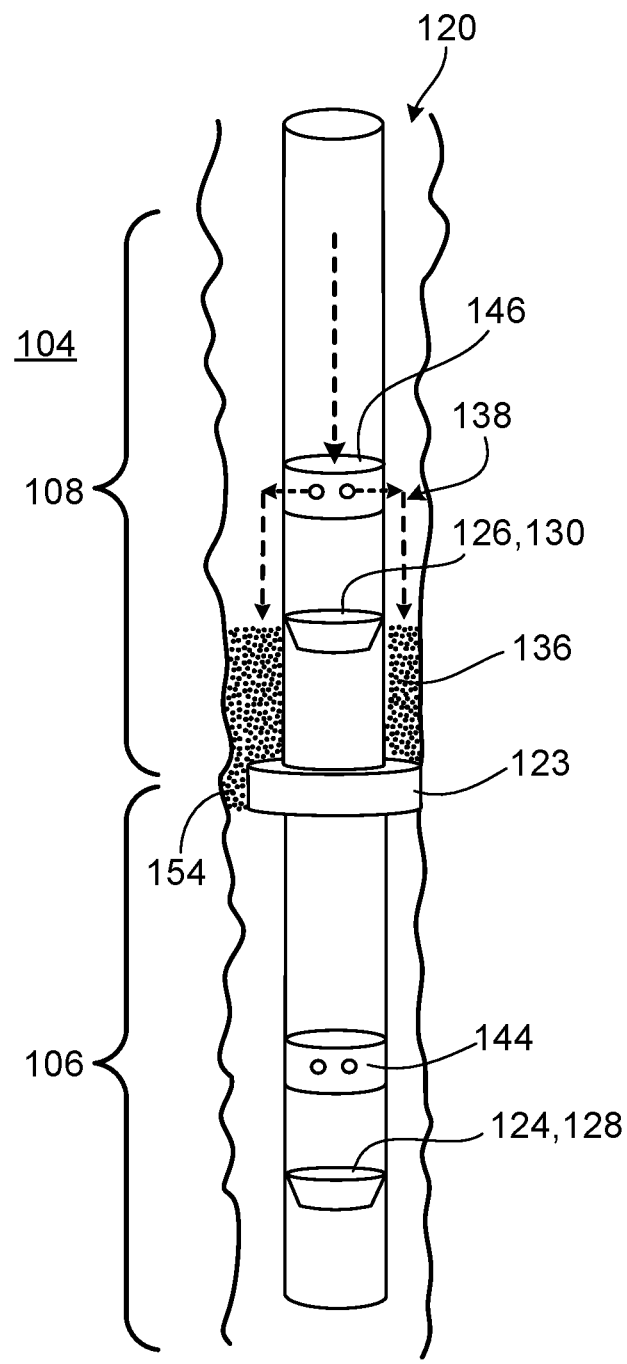
FIG. 2 is an enlarged perspective view of a production pipe of the well completion system of FIG. 1.

Referring to FIG. 2, the production pipe 120 is equipped with two fracturing ports 144, 146 (for example, sleeves) positioned respectively above the seats 128, 130. Fluid 136 (for example, stimulation fluid or diversion fluid, which will be discussed below) can flow out of the production liner 120 and into the wellbore 102 when the fracturing ports 144, 146 are in an activated state (for example, an open state), as indicated by the flow path 138. In a non-activated state of a fracturing port 144, 146 (for example, before the corresponding ball 132, 134 seals the seat 128, 130 to commence stimulation of the stage 106, 108), the fracturing port 144, 146 is in a closed state. Referring to both FIGS. 1 and 2, once the ball 132, 134 seals the seat 128, 130, and pressure of the fluid delivered to the production liner 120 is great enough to shift the fracturing port 144, 146 into an open state, the fracturing port 144, 146 opens to allow fluid to flow from the production pipe 120 into the wellbore 102 along the stage 106, 108. That is, the fracturing ports 144, 146 are designed to shear at a certain threshold pressure. Such threshold pressure is typically between about 1,800 pounds per square inch (psi) and about 2,200 psi.

Figure 3:
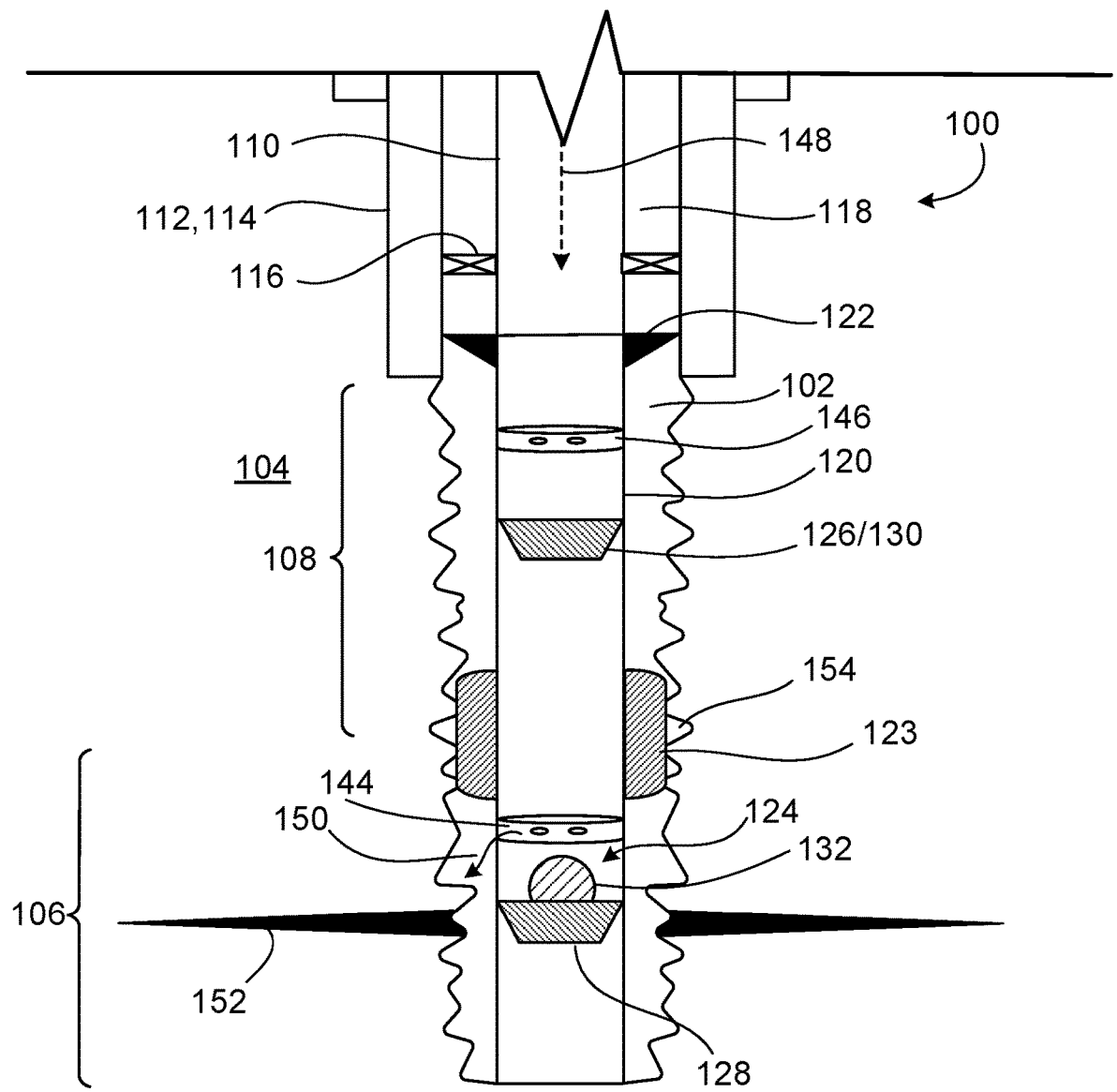
FIGS. 3-5 illustrate an example multi-stage fracturing process carried out with respect to the well completion system of FIG. 1.
Figure 4:
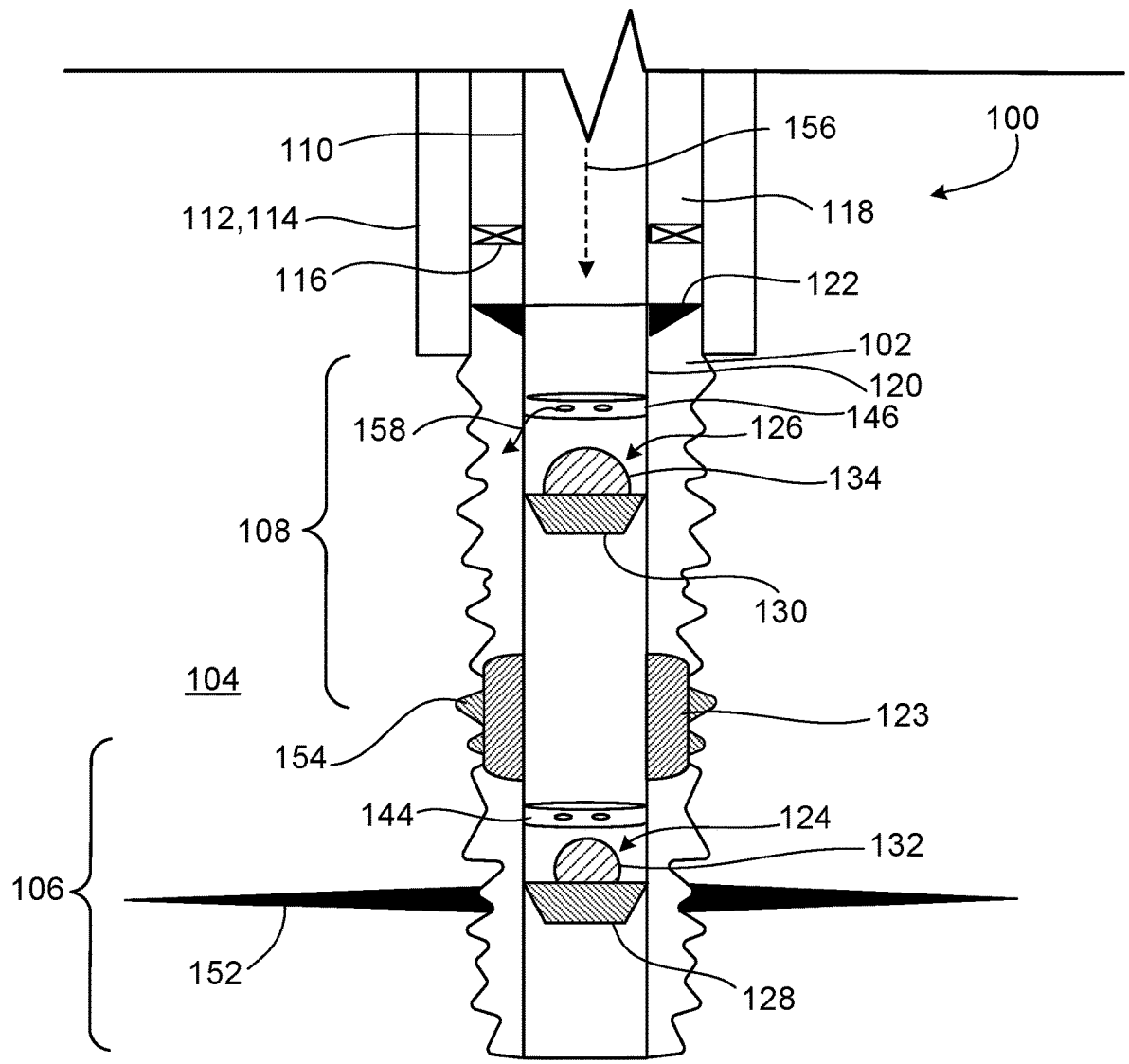
Figure 5:
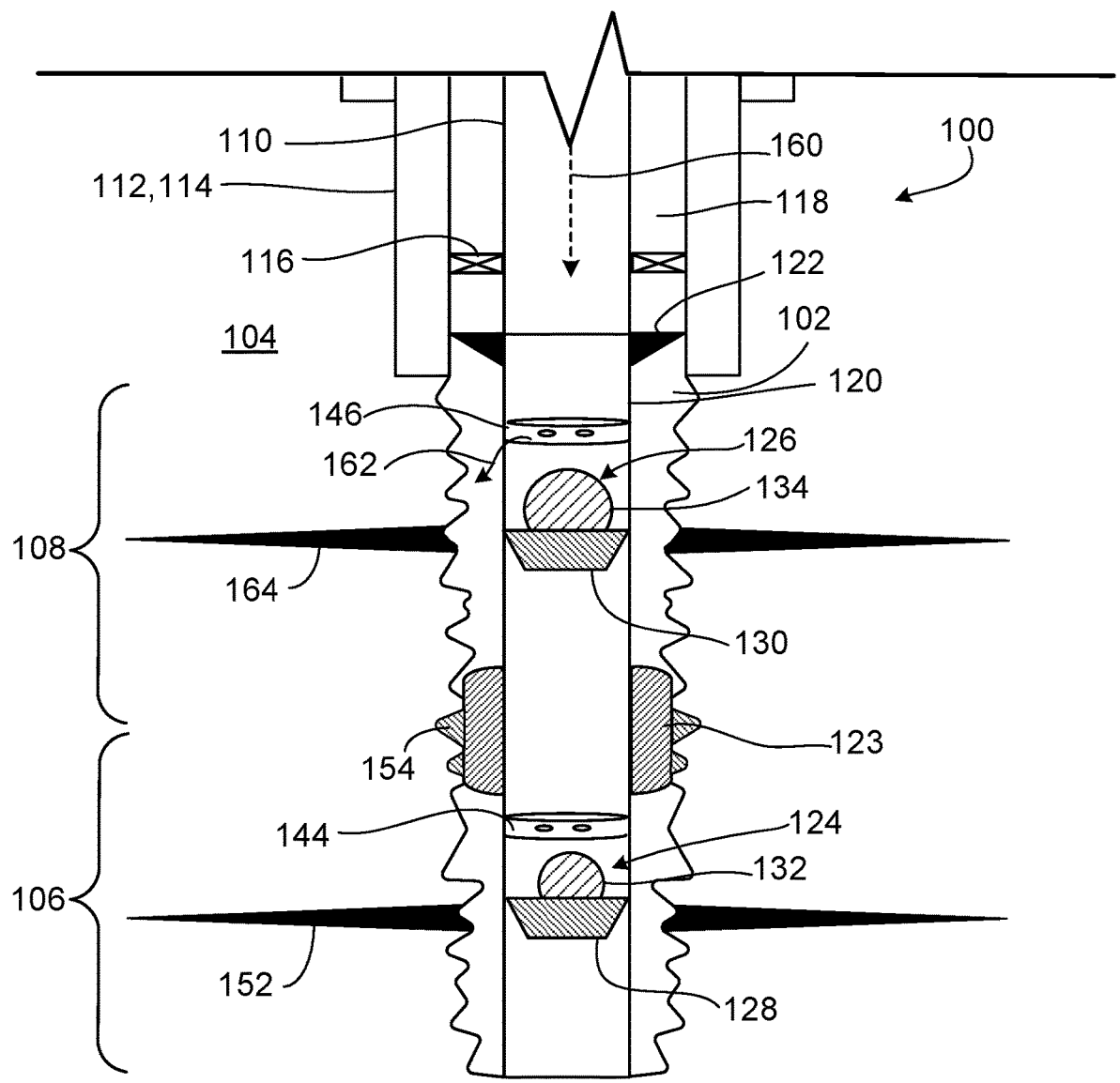

FIGS. 3-5 illustrate sequential steps of a stimulation process carried out based on the example illustration provided in FIG. 1. Referring particularly to FIG. 3, the ball 132 is delivered to the production pipe 120 to stimulate the first stage 106. The ball 132 passes through the seat 130 and abuts and seals the seat 128. Stimulation fluid is delivered to the production pipe 120 (indicated by an arrow 148) and causes the fracturing port 144 (shown in FIG. 2) to shift into an open state once the pressure of the stimulation fluid reaches the threshold pressure. Accordingly, the stimulation fluid can pass through the fracturing port 144 (indicated by an arrow 150) into the wellbore 102 along the stage 106. The stage 106 is stimulated until a fracture 152 of sufficient extent is generated in the formation 104. A stage such as the example stage 106 is typically stimulated over a period of about 1 hours (h) to about 5 h (for example, about 1 h to about 4 h), depending on a temperature within the wellbore 102, depending on a pumping rate of the stimulation fluid, and depending on tightness of the formation 104 with respect to permeability of the formation 104.

Once stimulation of the first stage 106 has been completed, stimulation of the second stage 108 can begin. If it is determined that isolation has failed between the first and second stages 106, 108, then actions may be taken to ensure that the first stage 106 of the formation 104 is sufficiently fluidically isolated from the second stage 108 of the formation 104 prior to stimulating the second stage 108 or before continuing with stimulation of the second stage 108. For example, a diversion fluid may be delivered to the stage 108 to seal any gaps 154 formed between the formation packer 123 and the formation 104 to ensure sufficient isolation of the stages 106, 108 from each other. The diversion fluid may be delivered (for example, pumped) to the wellbore 102 in the same manner as by which the stimulation fluid is delivered to the wellbore 102. In some embodiments, the diversion fluid is a mixture (for example, a suspension or slurry) of degradable particles suspended in a liquid. The degradable particles may be provided as a fiber material that can block other, subsequently introduced fluids from flowing into previously stimulated regions. Certain equipment may be provided at the wellbore 102 in connection with the diversion fluid, such as a batch mixer for mixing the degradable particles with the liquid to form a slurry, a centrifugal pump for pumping the diversion fluid from the batch mixer, and a high pressure pump to which the diversion fluid is pumped from the centrifugal pump.

Upon entering the wellbore 102 from the production pipe 120, the degradable particles can flow into and plug any gaps 154 between the production packer 123 and the formation 102 such that stimulation fluid subsequently delivered to the wellbore 102 will be maintained along (for example, diverted to) the stage 108 as opposed to leaking downward through the gaps 154 into the stage 106. A total volume of the gaps 154 between the formation packer 123 and the formation 104 cannot be determined. Therefore, a total volume of diversion fluid needed to fluidically isolate the stages 106, 108 from each other without excessively plugging the formation 104 may be estimated based on historical trials of successful and unsuccessful uses of the diversion fluid. Avoiding excessive plugging of the formation 104 with the diversion fluid may prevent a potential problem of blocking the stimulation fluid, itself, from permeating the formation 104 within a desired amount of time in a subsequent step. The process of plugging the gaps 154 with the degradable particles of the diversion fluid typically lasts about 2 minutes (min) to about 15 min (for example, about 2 min to about 10 min). Once lodged within the gaps 154, the degradable particles may remain intact (for example, in a non-degraded state) for about 2 h to about 12 h until degrading (for example, therefore compromising the isolation), depending on a temperature within the wellbore 102. Eventual degradation of the particles ensures that the particles will not produce long-term flow restrictions or cause difficulty with future interventions that may be performed in the wellbore 102.

For example, referring to FIG. 4, the ball 134 is delivered to the production pipe 120 and abuts and seals the seat 130. Diversion fluid is delivered to the production pipe 120 (indicated by an arrow 156) and causes the fracturing port 146 (shown in FIG. 2) to shift into an open state once the pressure of the diversion fluid reaches the threshold pressure. Such shifting allows the diversion fluid to pass from the production pipe 120 into the wellbore 102 along the stage 108. Degradable particles within the diversion fluid seeps into the gaps 154 and plugs the gaps 154 to isolate the wellbore 102 along the stage 106 from the wellbore 102 along the stage 108.

Referring particularly to FIG. 5, once the gaps 154 have been sufficiently plugged with the diversion fluid, the stage 108 can be stimulated. For example, a pressure spike on a wellhead can indicate that fluids are no longer flowing into the previously stimulated stage 106 and are instead flowing into the target, unstimulated stage 108. Accordingly, with the ball 134 already sealed against the seat 130, stimulation fluid is delivered to the production pipe 120 (indicated by an arrow 160) and causes the fracturing port 146 (shown in FIG. 2) to again shift into an open state once the pressure of the stimulation fluid reaches the threshold pressure. The stimulation fluid passes through the fracturing port 146 (indicated by an arrow 162) into the wellbore 102 along the stage 108. With the gaps 154 plugged by the degradable particles of the diversion fluid, the stimulation fluid is prevented from leaking downward into the stage 106 and is maintained at the vertical position of the stage 108 within the wellbore 102 with a fluid pressure that is adequate for infiltrating the formation 102 to react with the formation 102. The stage 108 is stimulated until a fracture 164 of sufficient extent is generated in the formation 104. A stage such as the example stage 108 is typically stimulated over a period of about 1 h to about 5 h (for example, about 1 h to about 4 h), depending on the temperature in the wellbore 102, depending on a pumping rate of the stimulation fluid, and depending on tightness of the formation 104 with respect to permeability of the formation 104. Owing to the isolation of the stage 106 from the stage 108 due to the degradable particles within the gaps 154, the stage 108 can be stimulated at a fluid pressure that is sufficiently high to result in permeation and generation of the fracture 164.

Figure 6:
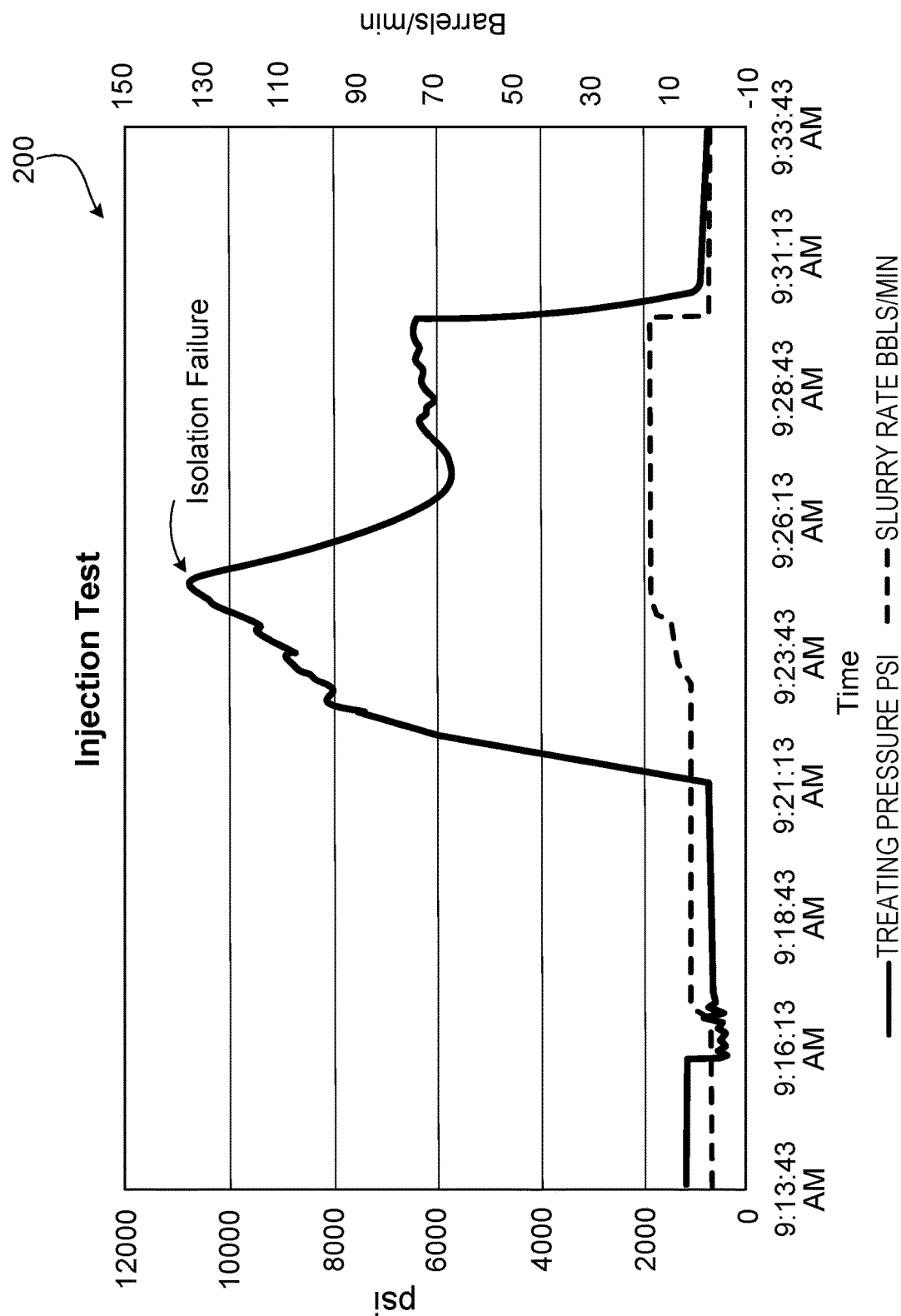
FIG. 6 is a graph showing results of an injection test performed at a wellbore within a rock formation.

In some embodiments, following stimulation of the first stage 106 and prior to isolation and stimulation of the second stage 108 as described above with respect to FIGS. 3-5, an injection test may be performed at the second stage 108 to determine whether or not the stage 108 has sufficient permeability to take up stimulation fluid at an operational pumping rate. For example, after the ball 134 has sealed against the seat 130, a test fluid (for example, water with formation-compatible additives, or, treated water) may be delivered to the production pipe 120. Referring to FIG. 6, a fluid pressure (for example, the treating pressure in FIG. 6) of the test fluid is monitored and illustrated in a graph 200. A sudden high loss of pressure indicates that the formation packer 123 that was isolating the stages 106, 108 from each other failed and therefore allowed the test fluid to pass downward between the packer 123 and the formation 104 from the second stage 108 (for example, the target stage) to the first stage 106 (for example, the previously stimulated stage) such that the stages 106, 108 are in fluid communication with each other.

Utilizing a diversion fluid prior to stimulating a stage or upon detection of an isolation failure during stimulation of a stage, as described above with respect to the second stage 108 and FIGS. 4 and 5, advantageously promotes diversion of the stimulation fluid within a wellbore, thus allowing isolation to be re-established between consecutive stages in cases where the isolation has failed. This process can therefore prevent or significantly delay subsequent cancellation of a stimulation process or subsequent failure of the stimulation process (for example, delivery of the stimulation fluid to the wellbore 102 over a prolonged period of time that fails to result in formation fracture). In this manner, such a technique maximizes an amount of time that the stimulation fluid may be exposed to the formation along a target stage.

Figure 7:
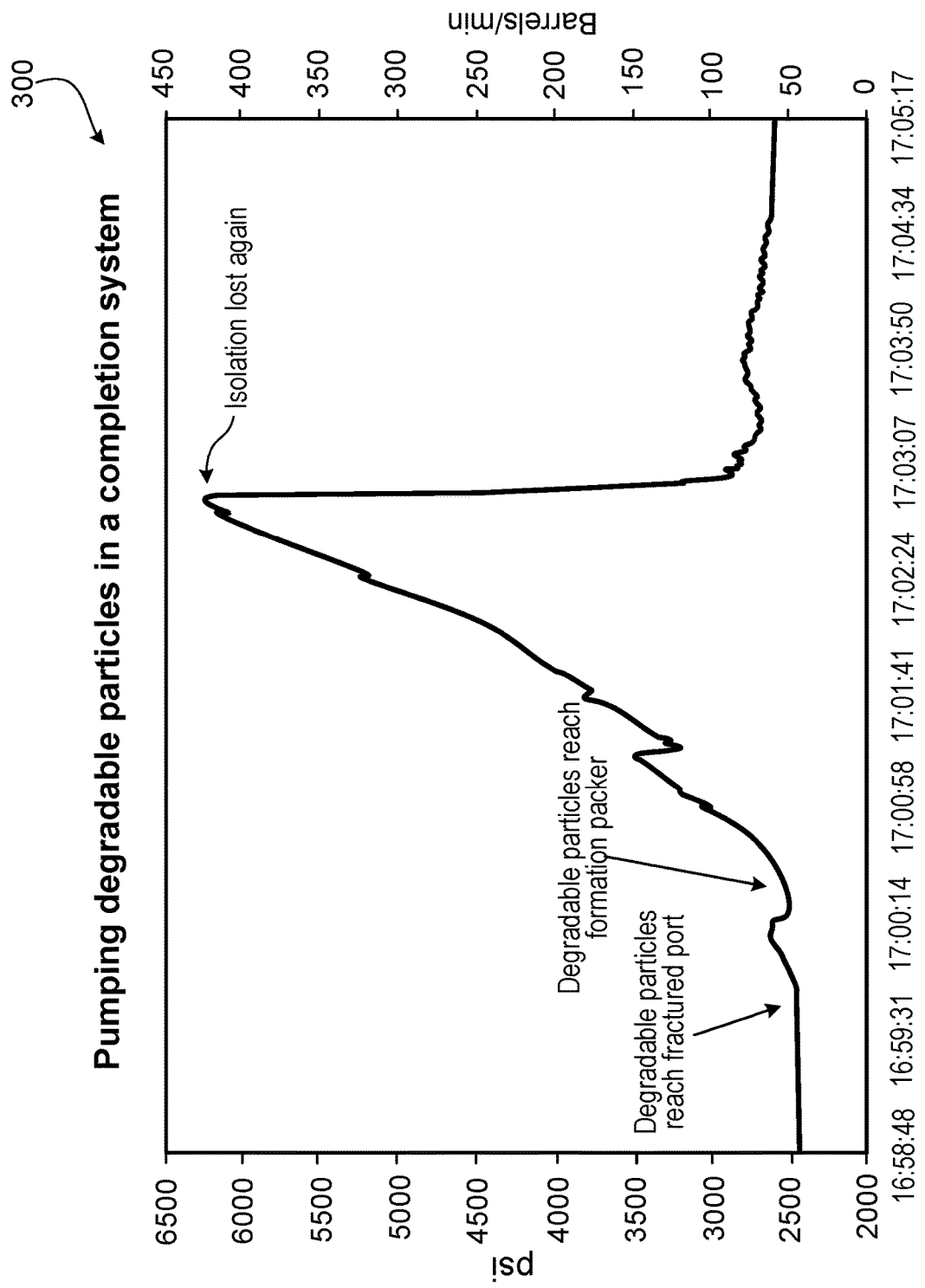
FIG. 7 is graph showing results of degradable particle delivery to a wellbore within a rock formation as part of a multi-stage fracturing process.

For example, FIG. 7 illustrates in a graph 300 how a formation with a failed stage isolation performs once a diversion fluid is delivered to the formation. As shown in the figure, the diversion fluid is able to attain about 3,700 psi of additional pressure (for example, comparing the peak pressure to the initial pressure) before isolation is lost again.

Figure 8:
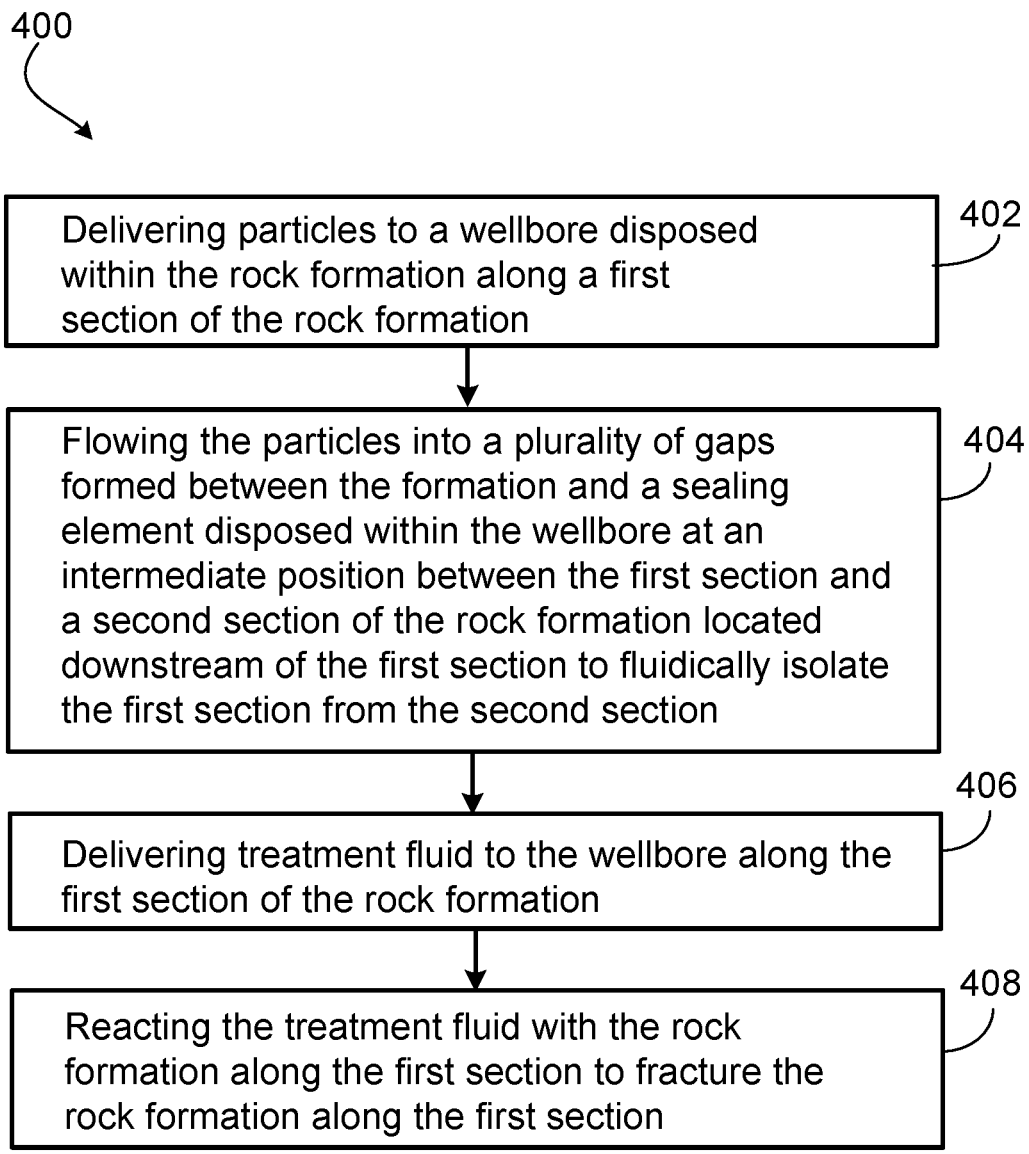
FIG. 8 is a flow chart illustrating an example method of fracturing a rock formation.

FIG. 8 is a flow chart illustrating an example method 400 (for example, a multi-stage fracturing process) of fracturing a rock formation (for example, the formation 104). In some embodiments, the method 400 includes delivering particles (for example, a suspension of degradable particles) to a wellbore (for example, the wellbore 102) disposed within the rock formation along a first section (for example, the stage 108) of the rock formation (402). In some embodiments, the method 400 further includes flowing the particles into a plurality of gaps (for example, the gaps 154) formed between the formation and a sealing element (for example, the formation packer 123) disposed within the wellbore at an intermediate position between the first section and a second section (for example, the stage 106) of the rock formation located downstream of the first section to fluidically isolate the first section from the second section (204). In some embodiments, the method 400 further includes delivering treatment fluid (for example, stimulation fluid) to the wellbore along the first section of the rock formation (406). In some embodiments, the method 400 further includes reacting the treatment fluid with the rock formation along the first section to fracture the rock formation (for example, producing the fracture 164) along the first section (408).

While embodiments have been described and illustrated with respect to certain dimensions, sizes, shapes, arrangements, materials, and configurations, in some embodiments, other embodiments that are substantially similar may include one or more different dimensions, sizes, shapes, arrangements, materials, and configurations. For example, while a multi-stage fracturing process has been described with respect to the formation 104 that includes two stages 106, 108, in some embodiments, the process may be carried out at a well that has more than two stages.

Other embodiments are also within the scope of the following claims.

What is claimed is:

1. A method of fracturing a rock formation, the method comprising:
   providing a tubular member within a wellbore of the rock formation;
   securing the tubular member to the rock formation with a packer disposed outside of the tubular member and within the wellbore to define a first section of the rock formation located upstream of the packer and a second section of the rock formation located downstream of the packer and the first section such that the packer is located at an intermediate position between the first section and the second section;
   flowing particles out of the tubular member through a fracturing port of the tubular member and into the wellbore along the first section of the rock formation;
   flowing the particles into a plurality of gaps formed between the rock formation and the packer at the intermediate position between the first section and the second section of the rock formation to fluidically isolate the first section from the second section;
   delivering a treatment fluid to the wellbore along the first section of the rock formation; and
   reacting the treatment fluid with the rock formation along the first section to fracture the rock formation along the first section.

2. The method of claim 1, wherein the treatment fluid is a first treatment fluid, the method further comprising delivering a second treatment fluid to the wellbore along the second section of the rock formation prior to delivering the particles to the wellbore along the first section of the rock formation.

3. The method of claim 2, further comprising reacting the second treatment fluid with the rock formation along the second section to fracture the rock formation along the second section.

4. The method of claim 1, wherein the particles comprise degradable particles that degrade after fracturing of the rock formation.

5. The method of claim 1, wherein the particles are suspended in a fluid.

6. The method of claim 5, further comprising flowing the particles through the tubular member disposed within the wellbore.

7. The method of claim 6, further comprising operating a ball-and-seat mechanism disposed within the tubular member along the first section of the rock formation to isolate the first section of the rock formation from the second section of the rock formation within an interior region of the tubular member.

8. The method of claim 7, further comprising activating the fracturing port of the tubular member under pressure of the treatment fluid within the interior region of the tubular member.

9. The method of claim 1, further comprising delivering a testing fluid to the wellbore along the second section of the rock formation before delivering the particles to the wellbore.

10. The method of claim 9, further comprising determining a lack of isolation between the first and second sections of the rock formation based on a drop in a pressure of the testing fluid before delivering the particles to the wellbore.

11. The method of claim 1, wherein the treatment fluid comprises an acidic fluid.

12. The method of claim 1, further comprising diverting the treatment fluid to the wellbore along the first section of the rock formation.

13. The method of claim 1, further comprising preventing the treatment fluid from flowing within the wellbore along the second section of the rock formation while delivering the treatment fluid to the first section of the rock formation.

14. The method of claim 1, further comprising pressurizing the treatment fluid.

15. The method of claim 14, wherein the treatment fluid can attain a fluid pressure of up to about 14,500 psi within the wellbore along the first section of the rock formation.

16. The method of claim 1, wherein the treatment fluid is first treatment fluid, wherein the plurality of gaps is a first plurality of gaps, wherein the packer is a first packer, wherein the fracturing port is a first fracturing port, and wherein the intermediate position is a first intermediate position, the method further comprising:
   flowing particles out of the tubular member through a second fracturing port of the tubular member and into the wellbore along a third section of the rock formation located upstream of the first section after fracturing the rock formation along the first section;
   flowing the particles into a second plurality of gaps formed between the formation and a second packer disposed within the wellbore at a second intermediate position between the third section and the first section to fluidically isolate the third section from the first section;
   delivering a second treatment fluid to the wellbore along the third section of the rock formation; and
   reacting the second treatment fluid with the rock formation along the third section to fracture the rock formation along the third section.

17. The method of claim 16, wherein the third section of the rock formation is adjacent to the first section.

18. The method of claim 1, wherein the second section of the rock formation is adjacent to the first section.

* * * * *